United States Patent
Rocha et al.

(10) Patent No.: US 7,361,321 B2
(45) Date of Patent: Apr. 22, 2008

(54) EXHAUST STREAM TREATMENT

(75) Inventors: Teresa Grocela Rocha, Clifton Park, NY (US); Alison Liana Palmatier, Porter Corners, NY (US); Jonathan Lloyd Male, Schoharie, NY (US); John Dewey Blouch, Glenville, NY (US); Benjamin Roe Wood, Niskayuna, NY (US); Frederic Vitse, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 367 days.

(21) Appl. No.: 11/178,555

(22) Filed: Jul. 11, 2005

(65) Prior Publication Data

US 2007/0009412 A1    Jan. 11, 2007

(51) Int. Cl.
*B01D 53/56* (2006.01)
(52) U.S. Cl. .................................. 423/239.1
(58) Field of Classification Search ............. 423/239.1
See application file for complete search history.

(56) References Cited

U.S. PATENT DOCUMENTS

| | | | |
|---|---|---|---|
| 4,682,468 A | 7/1987 | Dean et al. ................ 60/39.02 |
| 4,693,874 A | 9/1987 | Hurst ........................ 423/235 |
| 4,877,590 A * | 10/1989 | Epperly et al. ............. 423/235 |
| 4,888,165 A * | 12/1989 | Epperly et al. ............. 423/235 |
| 5,441,401 A | 8/1995 | Yamaguro et al. ............. 431/4 |
| 5,788,936 A * | 8/1998 | Subramanian et al. ... 423/213.2 |
| 5,809,774 A | 9/1998 | Peter-Hoblyn et al. ....... 60/274 |
| 5,894,728 A | 4/1999 | Wakamoto .................... 60/286 |
| 6,202,407 B1 | 3/2001 | Brusasco et al. ............. 60/274 |
| 2004/0057887 A1 | 3/2004 | Sun et al. .................... 423/235 |

FOREIGN PATENT DOCUMENTS

| JP | 05 280325 | 10/1993 |
|---|---|---|
| JP | 2000 026834 | 1/2000 |

OTHER PUBLICATIONS

European Search Report for European Paten Application No. 06 25 3295.

* cited by examiner

*Primary Examiner*—Timothy C. Vanoy
(74) *Attorney, Agent, or Firm*—Cantor Colburn LLP

(57) ABSTRACT

A method comprises injecting a reductant stream comprising a hydrocarbon reductant and water into an exhaust chamber comprising a nitrogen oxide-containing exhaust stream; contacting a composition comprising the reductant stream and exhaust stream with a catalyst; and decreasing a concentration of the nitrogen oxide in the composition comprising the reductant stream and exhaust stream. An exhaust stream treatment system, comprises an exhaust chamber comprising a catalyst; an exhaust stream comprising a nitrogen oxide; and a reductant stream comprising a hydrocarbon reductant and water.

14 Claims, 5 Drawing Sheets

Change in Ignition Time

EXHAUST STREAM TREATMENT

BACKGROUND

The present disclosure relates to exhaust stream treatment, and more particularly to systems and methods for the reduction of nitrogen oxide emissions.

Exhaust gases from internal combustion engines are a source of air pollution when discharged into the atmosphere. One class of pollutants, collectively referred to as nitrogen oxides ($NO_x$), includes nitric oxide/nitrogen monoxide (NO) and nitrogen dioxide ($NO_2$). These gases are known to be precursors to smog. Accordingly, progressively more stringent regulations are being implemented in an effort to reduce, and eventually eliminate, the concentration of $NO_x$ in exhaust emissions.

Numerous methods to control $NO_x$ emissions have been proposed. One particular area of focus has been on treatment of the post-combustion exhaust stream to produce less regulated gases that subsequently may be released into the atmosphere. Selective catalytic reduction (SCR) systems require the addition of a chemical reagent, which is a reducing agent or reductant, to mix and react with the exhaust stream over a catalyst to convert the $NO_x$ into unregulated gases such as nitrogen, oxygen, carbon dioxide if it is carbon based reductant and/or water vapor.

In an ideal system, the $NO_x$ and reductant concentrations would be exactly equal to their stoichiometric values, uniformly across the entire exhaust stream with a sufficiently long catalyst residence time (i.e., exposure time of reactants to catalyst), effective for complete reaction of the $NO_x$ and reductant to the unregulated gases. The result would be zero $NO_x$ and zero reductant leaving the catalyst and released into the atmosphere. However, in practice, there are several limitations in achieving uniform concentrations. One such limitation is the spontaneous partial oxidation or combustion of the reductant, in the presence of oxygen, at point sources immediately after introduction into the hot exhaust stream. This can result in inefficient usage of the reductant and inefficient reduction of $NO_x$.

Accordingly, many challenges exist for $NO_x$-reducing emission control technologies. One such challenge is to develop a method that maximizes the reduction of $NO_x$ to unregulated gases, while ensuring safety and minimizing inefficient use of the reductant.

BRIEF SUMMARY

Disclosed herein is a method comprising injecting a reductant stream comprising a hydrocarbon reductant and water into an exhaust chamber comprising a nitrogen oxide-containing exhaust stream; contacting a composition comprising the reductant stream and the exhaust stream with a catalyst; and decreasing a concentration of the nitrogen oxide in the composition comprising the reductant stream and the exhaust stream.

In another aspect, the method comprises flowing an exhaust stream from a combustion process of an internal combustion engine into an exhaust chamber, wherein the exhaust stream comprises a nitrogen oxide; injecting a reductant stream comprising a hydrocarbon reductant and water into the exhaust chamber using an injection grid comprising a plurality of injection nozzles; mixing the reductant stream with the exhaust stream, downstream of the injection grid and upstream of a catalyst, to produce a substantially homogeneous mixture; contacting the homogeneous mixture of the reductant stream and the exhaust stream with the catalyst; decreasing a concentration of the nitrogen oxide in the homogeneous mixture; and releasing the homogeneous mixture with the decreased concentration of the nitrogen oxide into an atmosphere outside of the exhaust chamber.

An exhaust stream treatment system comprises an exhaust chamber comprising a catalyst; an exhaust stream comprising a nitrogen oxide; and a reductant stream comprising a hydrocarbon reductant and water.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Systems and methods for treating an exhaust stream in order to decrease the concentration of nitrogen oxides ($NO_x$) released into the atmosphere are disclosed herein. In contrast to the prior art, the systems and methods disclosed herein are generally based on the co-injection of a reductant stream comprising a hydrocarbon reductant and water into the exhaust stream. The presence of water in combination with the reductant advantageously renders the reductant less flammable and any hazardous combustion of the reductant is decreased or eliminated. Under these desirable circumstances, a more safety-conscious and more reductant-efficient conversion of $NO_x$ to unregulated gases, such as nitrogen, oxygen, and/or water vapor, may occur.

As used herein, the term "exhaust stream" generally refers to a composition comprising $NO_x$ produced by a combustion process. The exhaust stream may further comprise carbon monoxide (CO), carbon dioxide ($CO_2$), molecular nitrogen ($N_2$), molecular oxygen ($O_2$), which can serve as a combustion fuel for the hydrocarbon reductant at increased temperatures, or a combination comprising at least one of the foregoing. In addition, uncombusted or incompletely combusted fuel may also be present in the exhaust stream.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. Furthermore, all ranges disclosed herein are inclusive of the endpoints and independently combinable.

In one embodiment, the method of treating the exhaust stream comprises injecting a reductant stream comprising a hydrocarbon reductant and water into the exhaust chamber comprising the exhaust stream comprising a $NO_x$; mixing the reductant stream with the exhaust stream; contacting a composition comprising the mixed reductant steam and exhaust stream with a catalyst; and decreasing the concentration of $NO_x$ in the composition.

Figure 1:
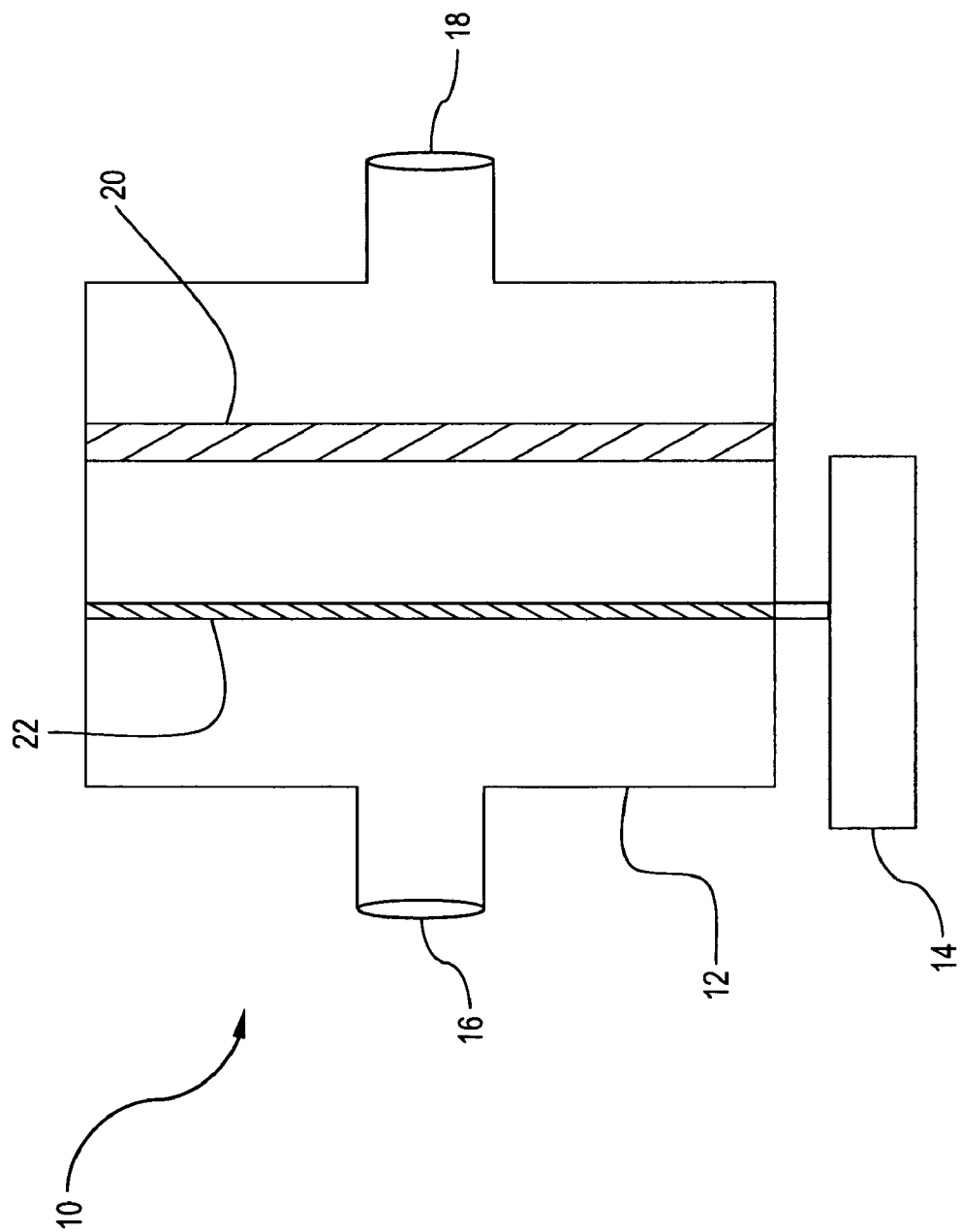
FIG. 1 is a schematic representation of an exhaust path for a gas turbine engine.

Referring now to FIG. 1, wherein an exemplary embodiment of an exhaust path 10 for a gas turbine engine is depicted. Although reference will be made herein to gas turbine engines, it is contemplated that the systems and methods can be employed in any application in which it may be desirable to reduce $NO_x$ emissions, such as in a motor vehicle, a locomotive, a boiler, process heater, incinerator, glass furnace, cement kiln, oil field steam generator, stationary generator, and the like.

The exhaust path 10 includes an exhaust chamber 12 and an injection and control skid 14, which are in fluid communication. The exhaust chamber 12 comprises an exhaust stream inlet 16 and an outlet 18. The exhaust chamber further comprises an injection grid 22, located downstream of inlet 16, in fluid communication with the injection and control skid 14, and a catalyst 20, located downstream of the injection grid 22 but upstream of outlet 18. The exhaust stream is produced from the combustion process and flows into the exhaust chamber 12 via inlet 16 towards the catalyst 20. When the reductant stream is injected into the exhaust chamber 12 from the injection and control skid 14 via a plurality of injection nozzles (not shown) of the injection grid 22, it can mix with the exhaust stream in the region downstream of injection grid 22 and upstream of the catalyst 20. When the mixture comprising the reductant stream and the exhaust stream contacts the catalyst 20, catalytic reduction of the $NO_x$ to the unregulated gases occurs. After the concentration of the $NO_x$ is decreased or eliminated, the catalyzed composition may be discharged from the exhaust chamber 12 via outlet 18.

The exhaust stream, produced from the combustion process, may have a temperature of about 150 to about 1100 degrees Celsius (° C.) depending on the fuel used, the load on the engine, the length of the flow path from the combustion chamber (not shown) downstream to the exhaust chamber 12, ambient temperature, and the like. In one embodiment, the temperature of the exhaust stream is about 350 to about 450° C.

The hydrocarbon reductant may be injected in liquid and/or gaseous form. Similarly, the water may be injected as liquid and/or steam. In one embodiment, the hydrocarbon reductant and water are injected from injection grid 22 into the exhaust chamber 12 independently but simultaneously. Alternatively, the hydrocarbon reductant and water may be injected independently in a rapid-pulsed alternating manner to facilitate mixing of the reductant stream in the exhaust chamber 12. In another embodiment, the hydrocarbon reductant and water are mixed in the injection and control skid 14 prior to being injected, and are injected into the exhaust chamber 12 as a single reductant stream. It does not appear critical that the hydrocarbon reductant and the water be miscible. However, the possibility of phase separation after injection decreases if the hydrocarbon reductant and water are miscible.

The hydrocarbon reductant and/or the water may be heated by any suitable means prior to injection into the exhaust chamber 12. For example, heat may be supplied to the hydrocarbon reductant and/or the water directly or indirectly (e.g., by heating the vessel(s) in which the hydrocarbon reductant and/or the water are maintained prior to injection) using electrical energy, a hot gas (e.g., air or slip stream gas), steam, dielectric heating, and the like. Alternatively, they may be injected at ambient temperature (i.e., about 18 to about 28° C.) and are heated when mixed with the exhaust stream in the exhaust chamber 12. It does not appear critical that the hydrocarbon reductant and the water be injected at the same temperature. It is important to note that when the hydrocarbon reductant is heated prior to injection, the temperature of heating is limited by the occurrence of undesirable chemical reactions, such as cracking, decomposition, or combustion. Suitable temperatures to which the water and/or hydrocarbon reductant are heated may be determined by those skilled in the art in view of this disclosure without undue experimentation.

Similarly, the hydrocarbon reductant may be at the same or a different pressure from that of the water prior to injection. However, their pressures must independently be greater than the pressure of the exhaust stream. Suitable pressures to which the water and/or hydrocarbon reductant are pressurized may be determined by those skilled in the art in view of this disclosure without undue experimentation.

A desirable amount of water in the reductant stream is such that the desired reduction in combustion of the reductant occurs without substantially diminishing the catalytic activity of the catalyst 20. This amount can readily be determined by one of ordinary skill in the art without undue experimentation. Depending on the particular catalyst, the amount of water in the reductant stream is about 0.01 to about 15 volume percent (vol %) based on the total number of moles of the reductant stream injected into the exhaust chamber 12. It should be recognized, by those skilled in the art, that increased exhaust stream temperature and/or $O_2$ content will necessitate increased water content in the reductant stream to minimize or prevent combustion of the hydrocarbon reductant.

The hydrocarbon reductant is chosen based on its compatibility with the particular catalyst 20. As discussed previously, the hydrocarbon reductant may be injected as a liquid and/or gas. Generally, hydrocarbons of less than about 16 carbon atoms will be suitable, although hydrocarbons with higher numbers of carbon atoms may also be liquids and/or gases, for example, depending on their chemical structure, temperature, and pressure. The hydrocarbons may be of any type, including, for example, alkanes, alkenes, alcohols, ethers, esters, carboxylic acids, aldehydes, ketones, carbonates, and the like. The hydrocarbons may be straight chained, branched, or cyclic. Suitable hydrocarbons include hexane, butane, propane, ethane, 2,2,4-trimethyl pentane, octane, propene, ethene, butene, methanol, ethyl alcohol, 1-butanol, 2-butanol, 1-propanol, isopropanol, isobutanol, dimethyl ether, dimethyl carbonate, acetaldehyde, acetone, and the like.

In one embodiment, the hydrocarbon reductant is a mixture of hydrocarbons. The hydrocarbon reductant may be a mixture of hydrocarbons that are all of the same type or it may contain a mixture of different hydrocarbons. Further, the mixture may be a mixture of hydrocarbons all having the same number of carbon atoms such as octane, octene and 1,3-dimethyl-cyclohexane, for example. Likewise, the mixture may be a mixture of hydrocarbons having different numbers of carbon atoms such as hexane, pentane, and butane, for example. Exemplary mixtures include gasoline and kerosene.

After injecting the reductant stream into the exhaust chamber 12, it mixes with the exhaust stream. The ratio of the exhaust stream to the reductant stream may be about 50:1 to about 10000:1. Desirably, the mixture formed from mixing the reductant stream and the exhaust stream is substantially homogeneous prior to contacting the catalyst 20. The contacting or residence time of the composition comprising the mixed reductant steam and exhaust stream with the catalyst 20 is at least about 0.001 seconds, and may be as long as about 2 seconds, depending on the concentration of the $NO_x$ species in the exhaust stream as well as the reductant and catalyst choices.

The catalyst 20 must be selected such that it is not adversely affected (i.e., thermal and/or chemical deactivation) by the temperature, $O_2$ content, fuel contaminants, and water content of the exhaust stream produced by the combustion process. The choice of catalyst can readily be made by those skilled in the art in view of this disclosure without undue experimentation. For example, especially useful for higher temperatures (e.g., greater than about 300° C.) are metal oxide-based or zeolite-type catalysts. Precious metal catalysts are more appropriate for lower temperature (e.g., less than about 300° C.) applications. A combination of catalysts that are effective at various temperatures may also be used for applications that operate at different temperature ranges.

Suitable metal oxide-based catalysts include a catalytic metal oxide disposed on a metal oxide support. Catalytic metal oxides include vanadium oxide, gallium oxide, indium oxide, molybdenum oxide, magnesium oxide, silver oxide, barium oxide, manganese oxide, and the like. The metal oxide support may be formed from aluminum oxide, titanium oxide, zirconium oxide, cerium oxide, silicon dioxide, and the like.

Suitable zeolite-type catalysts include any of the more than about 40 known members of the zeolite group of minerals and their synthetic variants, including for example Zeolites A, X, Y, USY, ZSM-5, and the like, in varying Si to Al ratios and/or with varying dopant concentrations.

Suitable precious metal catalysts include a precious metal disposed on a support. Precious metals include Pt, Pd, Rh, and the like. The support may include metal oxide supports as described above, in addition to silicon carbide, calcium carbonate, barium sulfate, lanthanum oxide, yttrium oxide, cerium oxide, and the like.

Advantageously, the methods described herein based on the co-injection of a hydrocarbon reductant and water are more reductant-efficient compared to dry compositions and may reduce or eliminate the spontaneous combustion of the reductant that plague prior art exhaust treatment technology. The consumption of the hydrocarbon reductant may be delayed and/or decreased by about 75%. Furthermore, the amount of time that it takes for the hydrocarbon reductant to spontaneously combust may be increased by about 90%.

It should be recognized by those skilled in the art that the methods disclosed herein are relatively versatile in that they can be used in a variety of applications using a variety of catalysts and hydrocarbon reductants all while achieving significant $NO_x$ reductions. For example, $NO_x$ concentrations of less than 5 parts per million (ppm) may be achieved.

The present disclosure is illustrated by the following non-limiting examples.

EXAMPLE 1

Using the ChemKin software package (Version 3.7) from Reaction Design (San Diego, Calif.), the effects of the water to reductant ratio on reductant ignition and consumption for a range of temperatures were simulated. The calculations were performed assuming an idealized plug flow reactor model, wherein transport occurred through convection, under adiabatic conditions. Furthermore, selection of a catalyst was not required as the reaction (i.e., either spontaneous combustion or reaction with the exhaust stream) was modeled such that it occurred entirely within the gas phase.

For these calculations, water to reductant molar ratios of 1:1 and 2:1 were used and gaseous propene was selected as the reductant. The temperature was varied from 400 to 800° C. in 50° C. increments. Data were calculated based on the most reactive mixture of propene and a composition of 12 vol % $O_2$, 25 ppm NO, 9 vol % $H_2O$, with the balance being nitrogen.

Figure 2:
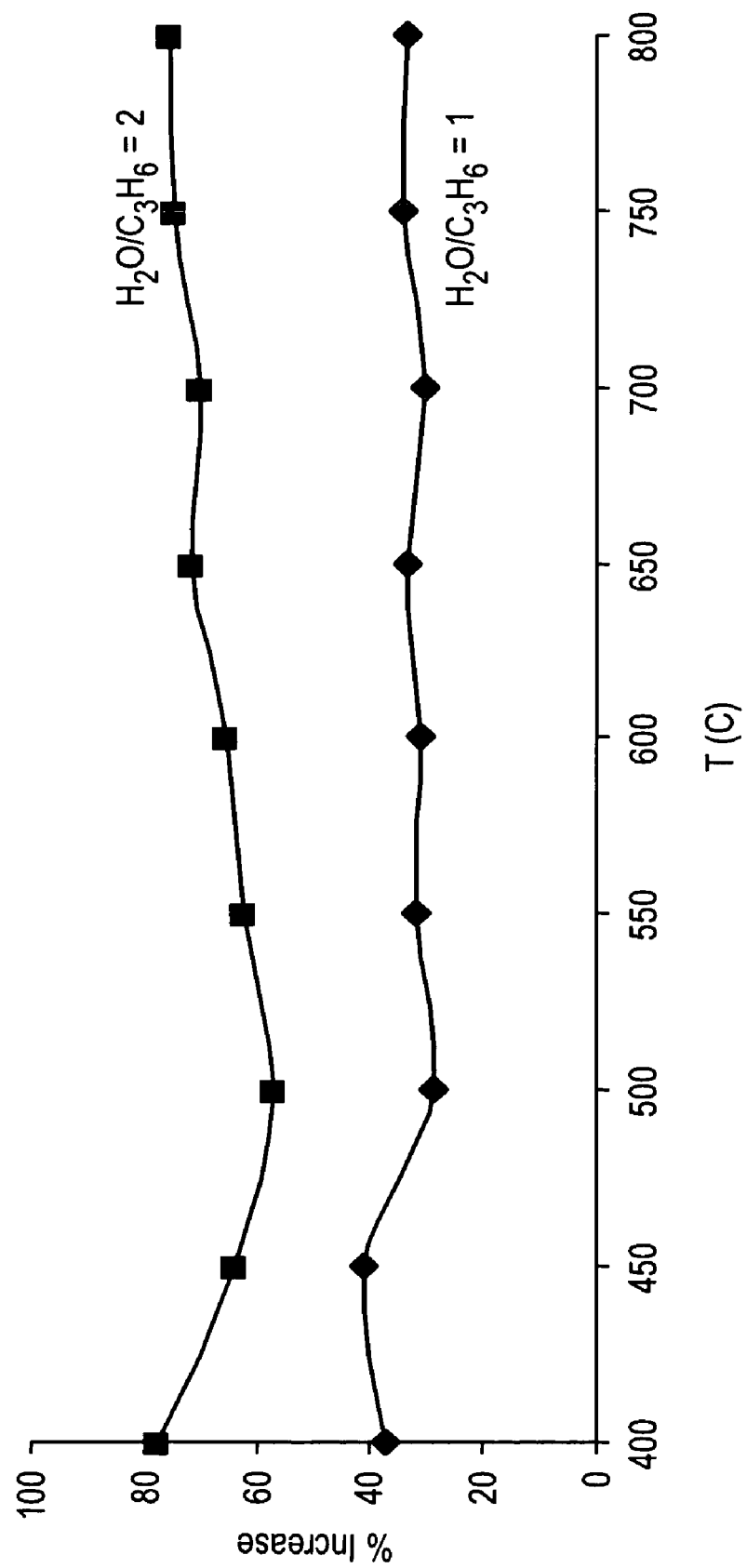
FIG. 2 is a graphical representation of the change in the ignition time for a propene reductant versus temperature for two different water to propene ratios.

FIG. 2 illustrates the change in the time for spontaneous combustion of the reductant. For these calculations, the time of spontaneous combustion was calculated as the time when 90% of the propene had been consumed. Furthermore the delay or increase in time, shown on the ordinate axis, was calculated relative to the time necessary for spontaneous combustion using a dry (i.e., water free) reductant stream. Throughout the observed temperature range, there was about a 30 to about 40% increase in the ignition time for a water to reductant molar ratio of 1:1, and about a 60 to about an 80% increase in the ignition time for a water to reductant molar ratio of 2:1.

Figure 3:
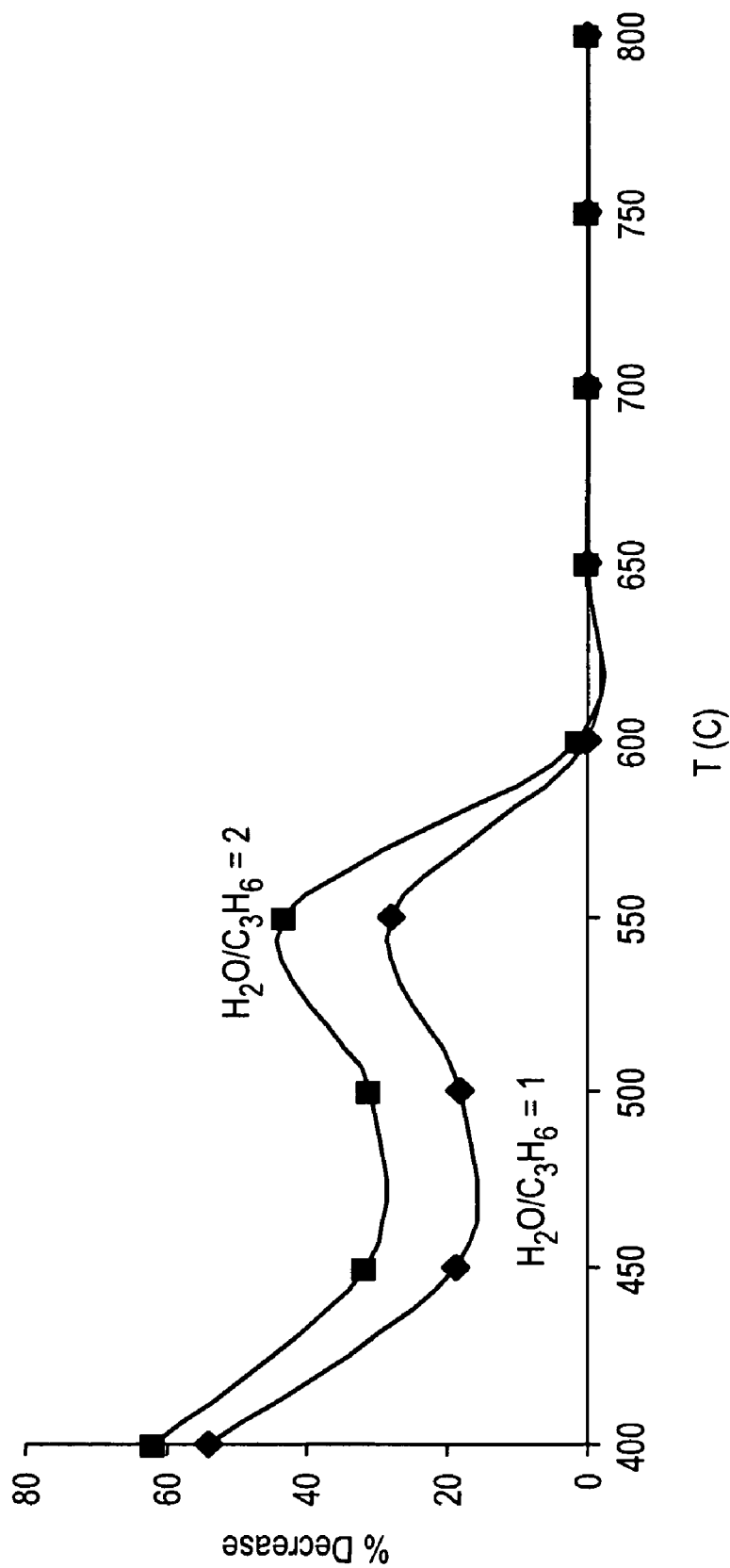
FIG. 3 is a graphical representation of the change in the propene reductant concentration after one second versus temperature for two different water to propene ratios.

FIG. 3 illustrates the change in propene consumption 1 second after injection into the exhaust chamber. Similarly, the decrease in consumption, shown on the ordinate axis, was calculated relative to the consumption level observed using a dry reductant stream. For temperatures below about 600° C., there was about a 20 to about 50% decrease in the consumption of propene for a water to reductant molar ratio of 1:1, and about an additional 5 to about 15% decrease in consumption for a water to reductant molar ratio of 2:1.

The data of Experiment 1 illustrated the projected advantages of incorporating water into the reductant stream. To summarize, the addition of water to propene in the reductant stream is expected to significantly increase the reductant ignition time and also decreased the level of propene consumption within 1 second of injection. Furthermore, as the ratio of water to propene was increased, there were additional improvements in these properties.

EXAMPLE 2

In this example, the effects of injected reductant concentration on the catalytic conversion of nitric oxide (NO) were determined. For these experiments, the catalyst was a catalytic gallium oxide and silver oxide mixture disposed onto a gamma-alumina support. 6.4 grams (g) of the catalyst were loaded into a quartz reactor, and the reactor was initially heated to 500° C. in air for about 2 hours. Subsequently, a gaseous mixture of 25 ppm NO, 12 vol % $O_2$, 9 vol % water, with the balance being $N_2$ was injected into the catalyst-loaded reactor and allowed to cool to 400° C. for a period of about 40 minutes.

In independent experiments, 50 ppm, 75 ppm, and 100 ppm of isopropyl alcohol (IPA) was injected into the reactor to provide carbon to NO ratios of 6:1, 9:1, and 12:1, respectively. After 40 minutes, the outlet concentrations of NO, nitrogen dioxide ($NO_2$), and nitrogen containing hydrocarbons (RONO) were measured.

Figure 4:
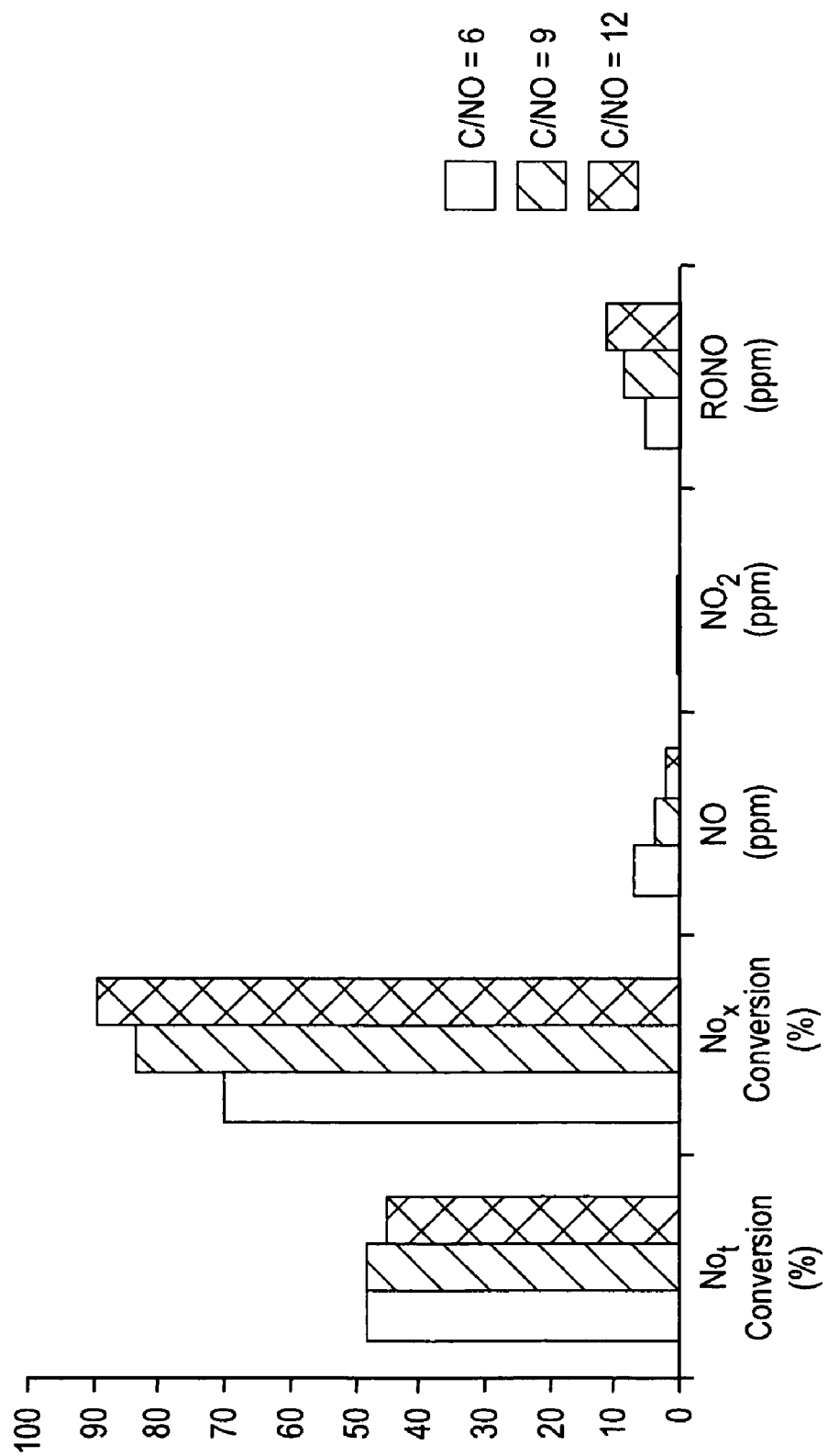
FIG. 4 is a graphical representation of various conversion rates and final concentrations of nitrogen-containing compositions for three different carbon to NO ratios.

FIG. 4 illustrates the results of these experiments. The left-most set of bars, captioned "$NO_t$ Conversion", represents the conversion percentage of the 25 ppm NO in the reactor to non-$NO_x$ (i.e., NO and $NO_2$) and non-RONO compounds. The second (from the left) set of bars, captioned "$NO_x$ Conversion", represents the conversion percentage of the 25 ppm NO in the reactor converted to non-$NO_x$ compounds. Accordingly, the difference between these two sets of bars, for each experiment, corresponds to the conversion of the initial NO into RONO compounds. The final three sets of bars represent the outlet concentrations of NO, $NO_2$, and RONO, and are labeled accordingly.

EXAMPLE 3

Figure 5:
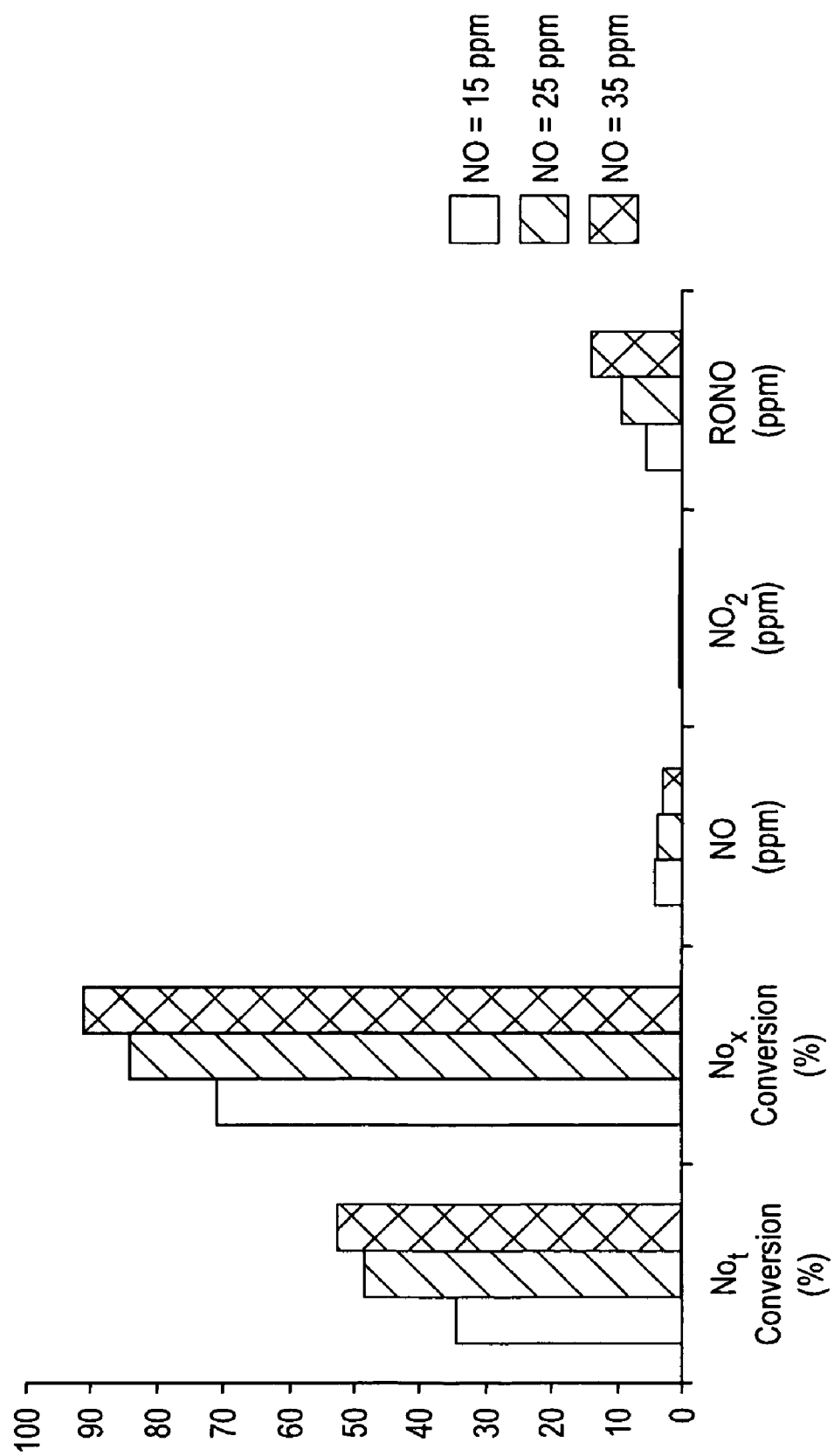
FIG. 5 is a graphical representation of various conversion rates and final concentrations of nitrogen-containing compositions for three different starting concentrations of NO in the exhaust stream.

In this example, the effects of the initial NO concentration on the catalytic conversion of nitric oxide (NO) were determined. The catalyst and reactor were prepared in the same fashion as described in Example 2. In this example, instead of an identical initial gas mixture, 15, 25, and 35 ppm NO were independently injected into the reactor, along with 12 vol % $O_2$, 9 vol % water, with the balance being $N_2$. To maintain a constant carbon to NO ratio of 9, IPA concentrations of 45, 75, and 105 ppm, respectively, were injected into the reactor after it had been cooled to 400° C. After 40 minutes, the outlet concentrations of NO, nitrogen dioxide ($NO_2$), and nitrogen containing hydrocarbons (RONO) were measured. The results of these experiments are illustrated in FIG. 5.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A method, comprising:
   injecting a reductant stream comprising a hydrocarbon reductant and water into an exhaust chamber comprising a nitrogen oxide-containing exhaust stream, wherein an amount of the water in the reductant stream is about 0.01 to about 15 volume percent of the reductant stream;
   contacting a composition comprising the reductant stream and the exhaust stream with a catalyst; and
   decreasing a concentration of the nitrogen oxide in the composition comprising the reductant stream and the exhaust stream.

2. The method of claim 1, further comprising mixing the hydrocarbon reductant and water to form a mixture prior to injecting.

3. The method of claim 1, further comprising heating the hydrocarbon and/or water prior to injecting.

4. The method of claim 1, wherein the exhaust chamber is a portion of a turbine engine.

5. The method of claim 1, wherein a temperature of the exhaust stream is about 150 to about 1100° C.

6. The method of claim 1, wherein a ratio of the exhaust stream to the reductant stream is about 50 to about 10000.

7. The method of claim 1, wherein the reductant is not miscible with the water.

8. A method, comprising:
   flowing an exhaust stream from a combustion process into an exhaust chamber, wherein the exhaust stream comprises a nitrogen oxide;
   injecting a reductant stream comprising a hydrocarbon reductant and water into the exhaust chamber using an injection grid comprising a plurality of injection nozzles wherein an amount of the water in the reductant stream is about 0.01 to about 15 volume percent of the reductant stream;
   mixing the reductant stream with the exhaust stream, downstream of the injection grid and upstream of a catalyst, to produce a substantially homogeneous mixture;
   contacting the homogeneous mixture of the reductant stream and the exhaust stream with the catalyst;
   decreasing a concentration of the nitrogen oxide in the homogeneous mixture; and
   releasing the homogeneous mixture with the decreased concentration of the nitrogen oxide into an atmosphere outside of the exhaust chamber.

9. The method of claim 8, further comprising mixing the hydrocarbon reductant and the water to form a mixture prior to injecting.

10. The method of claim 8, further comprising heating the hydrocarbon and/or water prior to injecting.

11. The method of claim 8, wherein the combustion process occurs in a turbine engine.

12. The method of claim 8, wherein a temperature of the exhaust stream is about 150 to about 1100° C.

13. The method of claim 8, wherein a ratio of the exhaust stream to the reductant stream is about 50 to about 10000.

14. The method of claim 8, wherein the reductant is not miscible with the water.

* * * * *